(12) United States Patent
Fan et al.

(10) Patent No.: US 12,249,180 B2
(45) Date of Patent: Mar. 11, 2025

(54) SYSTEM AND METHOD FOR DETECTING A FACIAL APPARATUS

(71) Applicant: Centre for Intelligent Multidimensional Data Analysis Limited, Hong Kong (CN)

(72) Inventors: Xinqi Fan, Hong Kong (CN); Hong Yan, Hong Kong (CN)

(73) Assignee: Centre for Intelligent Multidimensional Data Analysis Limited, Hong Kong (CN)

( * ) Notice: Subject to any disclaimer, the term of this patent is extended or adjusted under 35 U.S.C. 154(b) by 643 days.

(21) Appl. No.: 17/514,498

(22) Filed: Oct. 29, 2021

(65) Prior Publication Data

US 2023/0137381 A1    May 4, 2023

(51) Int. Cl.
*G06V 40/00*  (2022.01)
*G06N 3/08*   (2023.01)
*G06V 40/16*  (2022.01)

(52) U.S. Cl.
CPC ............. *G06V 40/168* (2022.01); *G06N 3/08* (2013.01); *G06V 40/161* (2022.01)

(58) Field of Classification Search
CPC .. G06V 40/16–179; G06V 10/82; G06N 3/08; G06N 3/084; G06N 3/0464
See application file for complete search history.

(56) References Cited

U.S. PATENT DOCUMENTS

| | | | | |
|---|---|---|---|---|
| 10,198,624 B2* | 2/2019 | Li | ............................. | G06T 7/143 |
| 10,984,225 B1* | 4/2021 | Ghosh | .................. | G06V 40/161 |
| 11,527,104 B2* | 12/2022 | Rittman | .................... | G06T 7/50 |
| 11,935,322 B1* | 3/2024 | Cao | ........................ | G06V 40/162 |
| 2017/0364738 A1* | 12/2017 | Wang | ........................ | G06T 7/90 |
| 2018/0285630 A1* | 10/2018 | Han | ........................ | G06V 40/172 |
| 2019/0080149 A1* | 3/2019 | Gernoth | .............. | G06V 40/166 |
| 2019/0171866 A1* | 6/2019 | Lu | .............................. | G06T 3/02 |
| 2019/0205616 A1* | 7/2019 | Hong | ................... | G06V 40/171 |
| 2019/0332851 A1* | 10/2019 | Han | ...................... | G06V 40/171 |
| 2019/0362190 A1* | 11/2019 | Gvsl | .......................... | G06T 5/60 |
| 2019/0370533 A1* | 12/2019 | Han | ........................ | G06V 40/172 |
| 2020/0005060 A1* | 1/2020 | Martin | ................ | G06V 40/197 |
| 2020/0012887 A1* | 1/2020 | Li | ......................... | G06V 10/809 |
| 2020/0042770 A1* | 2/2020 | Yan | ....................... | G06V 40/172 |
| 2020/0065955 A1* | 2/2020 | Garlapati | ............... | G06V 20/00 |
| 2020/0074199 A1* | 3/2020 | Tseng | .................... | G06V 10/764 |
| 2020/0104567 A1* | 4/2020 | Tajbakhsh | ........... | G06V 40/165 |
| 2021/0182625 A1* | 6/2021 | Arar | ....................... | G06F 18/214 |
| 2021/0183020 A1* | 6/2021 | Gollanapalli | ........... | G06T 9/002 |

(Continued)

OTHER PUBLICATIONS

M. Loey, G. Manogaran, M. Taha, et al., "A hybrid deep transfer learning model with machine learning methods for face mask detection in the era of the COVID-19 pandemic," Elsevier, Measurement, vol. 167, 108288, 2021.

(Continued)

*Primary Examiner* — Aaron W Carter

(74) *Attorney, Agent, or Firm* — MOSER TABOADA

(57) ABSTRACT

A system and method for detecting a facial apparatus including a facial image processor arranged to process an image or a stream of images to detect a facial apparatus on one or more faces represented within the image or the stream of images; and generating a notification output based on a detection of the facial apparatus on the one or more faces.

17 Claims, 6 Drawing Sheets

(56) References Cited

U.S. PATENT DOCUMENTS

| | | | |
|---|---|---|---|
| 2021/0200993 A1* | 7/2021 | Chen | G06V 10/82 |
| 2021/0264207 A1* | 8/2021 | Smith | G06V 10/44 |
| 2021/0357625 A1* | 11/2021 | Song | G06T 5/70 |
| 2022/0044007 A1* | 2/2022 | Saleh | G06V 40/161 |
| 2022/0067132 A1* | 3/2022 | Learmonth | G06V 40/161 |
| 2022/0068109 A1* | 3/2022 | Zeng | G06V 40/165 |
| 2022/0075861 A1* | 3/2022 | Nicol | G06F 21/32 |
| 2022/0075862 A1* | 3/2022 | Torre | G06V 40/165 |
| 2022/0092331 A1* | 3/2022 | Stoppa | G06V 30/274 |
| 2022/0100989 A1* | 3/2022 | Zhu | G06F 21/602 |
| 2022/0101499 A1* | 3/2022 | Zak | G06T 3/18 |
| 2022/0108101 A1* | 4/2022 | Bui | G06N 3/045 |
| 2022/0261958 A1* | 8/2022 | Akkaraju | G06T 7/90 |
| 2022/0300591 A1* | 9/2022 | Kim | G06V 40/168 |
| 2022/0301290 A1* | 9/2022 | Huang | G06V 40/168 |
| 2022/0327861 A1* | 10/2022 | Yang | G06V 10/82 |
| 2022/0343934 A1* | 10/2022 | Lynch | G10L 21/034 |
| 2022/0392254 A1* | 12/2022 | Ye | G06V 40/161 |
| 2023/0033052 A1* | 2/2023 | Qiu | G06V 40/172 |
| 2023/0082834 A1* | 3/2023 | Verbeke | G06V 40/168 382/155 |
| 2023/0137381 A1* | 5/2023 | Fan | G06V 40/161 382/181 |
| 2023/0267735 A1* | 8/2023 | Fu | G06T 7/248 382/103 |
| 2023/0274582 A1* | 8/2023 | Vance | G06V 40/161 382/116 |
| 2023/0321468 A1* | 10/2023 | Karp | A62B 23/025 128/206.13 |
| 2023/0368239 A1* | 11/2023 | Jacobsen | H04Q 9/00 |
| 2024/0144717 A1* | 5/2024 | Feng | G06T 3/4053 |
| 2024/0334008 A1* | 10/2024 | Speth | H04N 21/42201 |

OTHER PUBLICATIONS

R. Biparnak, N. Subhadip, G. Debojit, et al., "MOXA: A Deep Learning Based Unmanned Approach for Real-Time Monitoring of People Wearing Medical Masks," Transactions of the Indian National Academy of Engineering, 5, 509-518, 2020.

M. Jiang and X. Fan, "RetinaMask: A Face Mask Detector," arXiv:2005.03950v1., May 11, 2020.

Xinqi Fan, et al., "A Deep Learning Based Light-Weight Face Mask Detector With Residual Context Attention and Gaussian Heatmap to Fight Against COVID-19", IEEE Access, vol. 9, 2021, Jul. 14, 2021, pp. 96964-96974.

* cited by examiner

SYSTEM AND METHOD FOR DETECTING A FACIAL APPARATUS

TECHNICAL FIELD

The present invention relates to a system and method for detecting a facial apparatus, and particularly, although not exclusively, to a system and method which uses a learning network to detect for facial apparatuses on a face as shown in an image or a stream of images.

BACKGROUND

Various experts and government departments have advised and proven that the wearing of face masks has a significant and noticeable reduction in the transmission of respiratory diseases. During the COVID-19 Pandemic, many Governments globally had encouraged their citizens to wear face masks in public areas, with some formally mandating that masks are worn in public areas.

Despite these requirements, it is not uncommon to observe non compliance with mask wearing mandates. Users may simply forget to wear their masks, or that they may feel uncomfortable with wearing a mask. During the COVID-19 Pandemic, it was not uncommon to see individuals refusing to wear masks in public enclosed spaces such as public transport or indoor venues.

Given the large volume of persons who may be required to wear masks, and the general difficulty in enforcing such requirements, it would be desirable to automatically detect such non-compliance in real time. However, traditional methods of object recognition or machine vision suitable for other forms of recognition are unable to effectively assist in this challenge due to the unique conditions of a mask, or lack thereof, on a user.

SUMMARY OF THE INVENTION

In accordance with a first aspect of the present invention, there is provided a system for detecting a facial apparatus comprising:
  a facial image processor arranged to process an image or a stream of images to detect a facial apparatus on one or more faces represented within the image or the stream of images; and
  generating a notification output based on a detection of the facial apparatus on the one or more faces.

In an embodiment of the first aspect, the facial image processor includes a learning network.

In an embodiment of the first aspect, the learning network includes a context enhancing module arranged to focus the learning network to extract features associated with facial apparatuses.

In an embodiment of the first aspect, the context enhancing module focuses the learning network to extract features associated with facial apparatuses by directing the learning network to portions of the image or the stream of images where facial apparatuses may appear.

In an embodiment of the first aspect, the context enhancing module includes a context enhancement block arranged to enhance context information of the image or the stream of images so as to direct the learning network to the features associated with facial apparatuses based on the context information of the image or the stream of images.

In an embodiment of the first aspect, the context enhancing module further includes a channel attention block arranged to enhance channel information of the image or the stream of images so as to direct the learning network to the features associated with facial apparatuses based on the channel information of the image or the stream of images.

In an embodiment of the first aspect, the context enhancing module further includes a spatial attention block arranged to enhance spatial information of the image or the stream of images so as to direct the learning network to the features associated with facial apparatuses based on the spatial information of the image or the stream of images.

In an embodiment of the first aspect, the learning network further includes a heatmap regression module arranged to direct the learning network to discriminate features associated with one or more faces represented on the image or the stream of images.

In an embodiment of the first aspect, the one or more faces is covered with an associated facial apparatus.

In an embodiment of the first aspect, the one or more faces is uncovered.

In an embodiment of the first aspect, the learning network includes a depth wise convolution network.

In an embodiment of the first aspect, the depth wise convolution network uses a depth-wise convolution and a point-wise convolution in series.

In an embodiment of the first aspect, the learning network includes a feature pyramid network.

In an embodiment of the first aspect, the feature pyramid network is arranged to fuse high-level semantic information with lower layer feature maps.

In an embodiment of the first aspect, the images or stream of images are processed by the learning network by propagating the images or stream of images through the depth wise convolution network, the feature pyramid network, the context enhancing module and the heatmap regression module, and wherein the learning network is trained by manipulating parameters of the depth wise convolution network, the feature pyramid network, the context enhancing module and the heatmap regression module during training.

In accordance with a second aspect of the present invention, there is provided a method for detecting a facial apparatus comprising the steps of:
  processing an image or a stream of images with a facial image processor, wherein the facial image processor is arranged to process the image or the stream of images to detect a facial apparatus on one or more faces represented within the image or the stream of images; and
  generating a notification output based on a detection of the facial apparatus on the one or more faces.

In an embodiment of the second aspect, the facial image processor includes a learning network.

In an embodiment of the second aspect, the learning network includes a context enhancing module arranged to focus the learning network to extract features associated with facial apparatuses.

In an embodiment of the second aspect, the context enhancing module focuses the learning network to extract features associated with facial apparatuses by directing the learning network to portions of the image or the stream of images where facial apparatuses may appear.

In an embodiment of the second aspect, the context enhancing module includes a context enhancement block arranged to enhance context information of the image or the stream of images so as to direct the learning network to the features associated with facial apparatuses.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
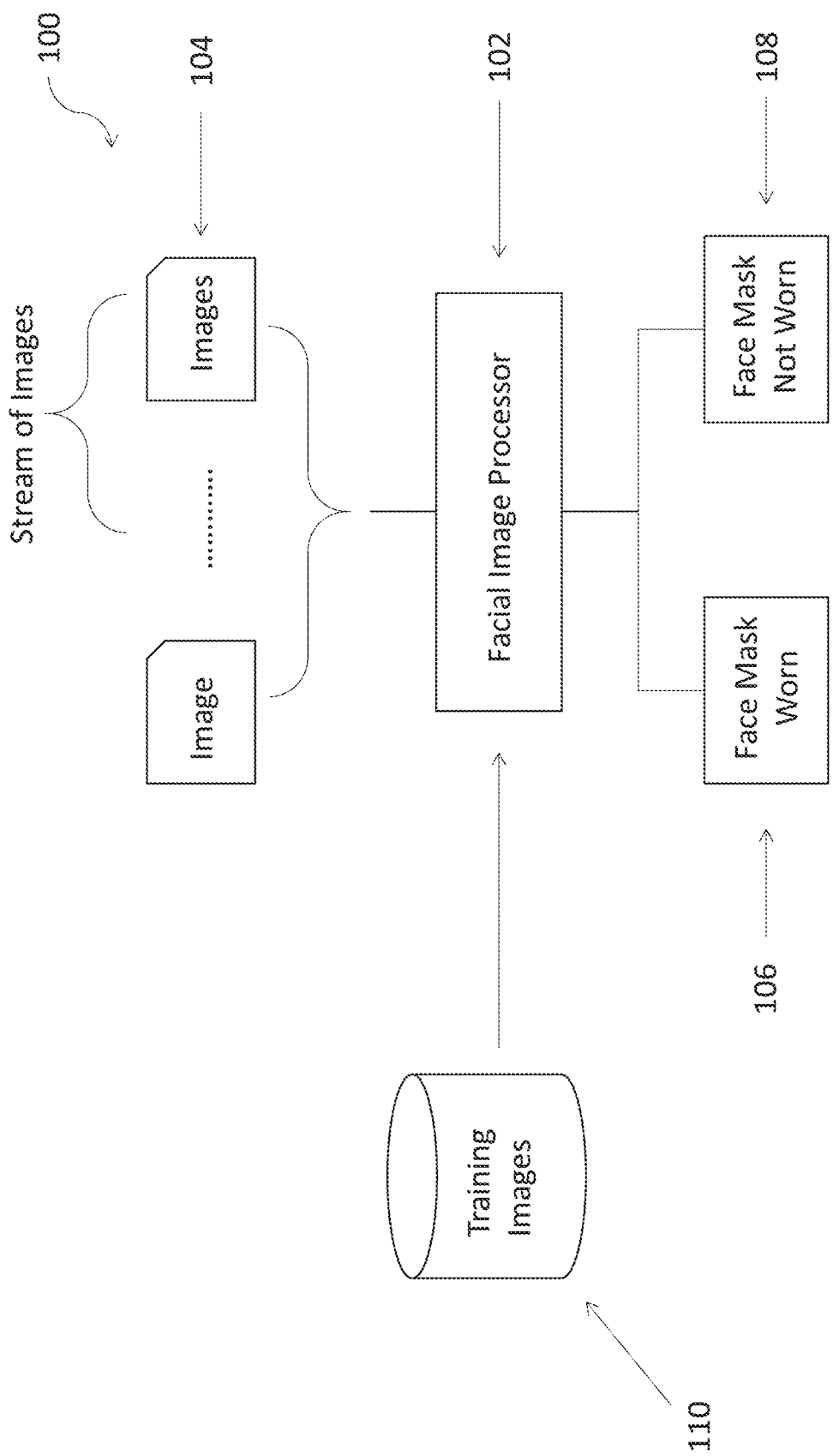
FIG. 1 is a block diagram of a system for detecting a facial apparatus in accordance with one embodiment of the present invention.

Referring to FIG. 1 there is illustrated a block diagram of an embodiment of a system and method for detecting a facial apparatus 100. In this embodiment, the system and method may be implemented in software, hardware, or a combination of both on a computer or computing apparatus such as a computer, computer server, cloud server, portable computing devices, wearable devices, smart devices, Internet of Things (IOT) devices, smart phones, tablet computers or edge computing devices.

The computer or computing apparatus may comprise suitable components necessary to receive, store and execute appropriate computer instructions. The components may include a processing unit (CPU), Graphic Processing Unit (GPU), Math Co-Processing unit, read-only memory (ROM), random access memory (RAM), and input/output devices such as disk drives, input devices such as an Ethernet port/WiFi port, a USB port, etc. Display such as a liquid crystal display, a light emitting display or any other suitable display and communications links. The computer may also include instructions that may be included in ROM, RAM, cloud drives or disk drives and may be executed by the processing unit or GPU. There may be provided a plurality of communication links which may variously connect to one or more computing devices such as a server, personal computers, terminals, wireless or handheld computing devices, cloud-based computer or computing services. At least one of a plurality of communications link may be connected to an external computing network through a telephone line, cellular connection or other type of communications link.

The computer or computing apparatus may include storage devices such as cloud storage services, a disk drive which may encompass solid state drives, hard disk drives, optical drives or magnetic tape drives. The computer may use a single disk drive or multiple disk drives. The computer may also have a suitable operating system which resides on the storage devices, disk drive or in the ROM of the computer.

The computer or computing apparatus may also provide the necessary computational capabilities to operate or to interface with a machine learning network, such as a neural network, to provide various functions and outputs.

In this embodiment, the system and method for detecting a facial apparatus 100 may be implemented to comprise:

a facial image processor 102 arranged to process an image or a stream of images 104 to detect a facial apparatus on one or more faces represented within the image or the stream of images; and generate a notification output based on a detection of the facial apparatus on the one or more faces.

As shown in FIG. 1, the system for detecting a facial apparatus 100 includes a facial image processor 102 arranged to receive an input 104 from an image source such as a file system, camera, or any image database or data source. The input may be a single image 104 or it may be a stream of images 104 as found in videos or moving pictures. Such an image 104 may contain any content or objects within any colour, channel, context in any spatial profile as it has been captured by the image source. Accordingly, in a typical operation scenario, the images 104 may be of any object, item, scenery, persons or combination of any, in any colour or lighting conditions of any quality and may be inputted for processing by the facial image processor 102. However, for the function of the facial image processor 102, which is arranged to detect for facial apparatus, it is preferred that the images 104 inputted to the facial image processor 102 would include at least one representation of a face such that the facial image processor 102 may determine if a facial apparatus, such as a face mask, is worn over or otherwise covering the face.

In this example, the facial image processor 102 is arranged to provide an output 106, 108 which determines if one or more detected faces within the image or images 104 is wearing or not wearing a facial apparatus. Such facial apparatus may include face masks, gas masks or any type of facial coverings, filters, barriers or accessories. The term "masks", or "face masks" is used within this document as a generic term for facial apparatuses, and may include, without limitations, dust masks, surgical face masks, gas masks, respirators, full face masks, decorative masks, dedicated face coverings or any apparatus or device which may be worn on the face or facial portions. In some alternative examples, as dependent on the training data 110 as described below in more details, such facial apparatus may also include items which may not be considered face masks but may be an accessory or object which may be worn on the face such as goggles, glasses, nose plugs, mouth guards or facial decorations/jewellery or accessories.

Preferably, the facial image processor 102 is implemented by the use of a learning network or machine learning arrangement, such as one or more neural networks of various architecture that may be trained by use of a suitable training data set 110. The training process may include the provision of training data, which may be in a form of images and a loss may then be calculated for the operation of the learning network which may then be used to update the parameters of the learning network during the training process. Once trained, the learning network, and thus the facial image processor 102, may then be used to receive image inputs 104 and determine if one or more faces as detected within the image or images, are wearing, coupled or covered with a facial apparatus. Examples of a suitable learning network 200 which may be implemented as part of an example embodiment facial image processor 102 is further described below with reference to FIGS. 2 to 4.

Embodiments of the facial image processor 102 may be able to provide a monitoring or detection service to determine or otherwise alert to persons who are not wearing a facial apparatus in areas where such facial apparatuses are required to be worn 106, 108. This may be in a work environment where persons present must use correct facial coverings or respirators to perform their duties, or it may be in any specific environments during Pandemics or other forms of disease control that it would be desirable to identify persons who are not complying with the requirements to wear a mask. The facial image processor 102 may also be implemented to operate with other forms of detection networks or processors, such as a facial recognition system so as to identify persons who are wearing or not wearing the necessary facial apparatuses, or it may also operate with alerts or recording systems to track or store images or persons who are 106, or are not 108, wearing the required facial apparatuses.

Figure 2:
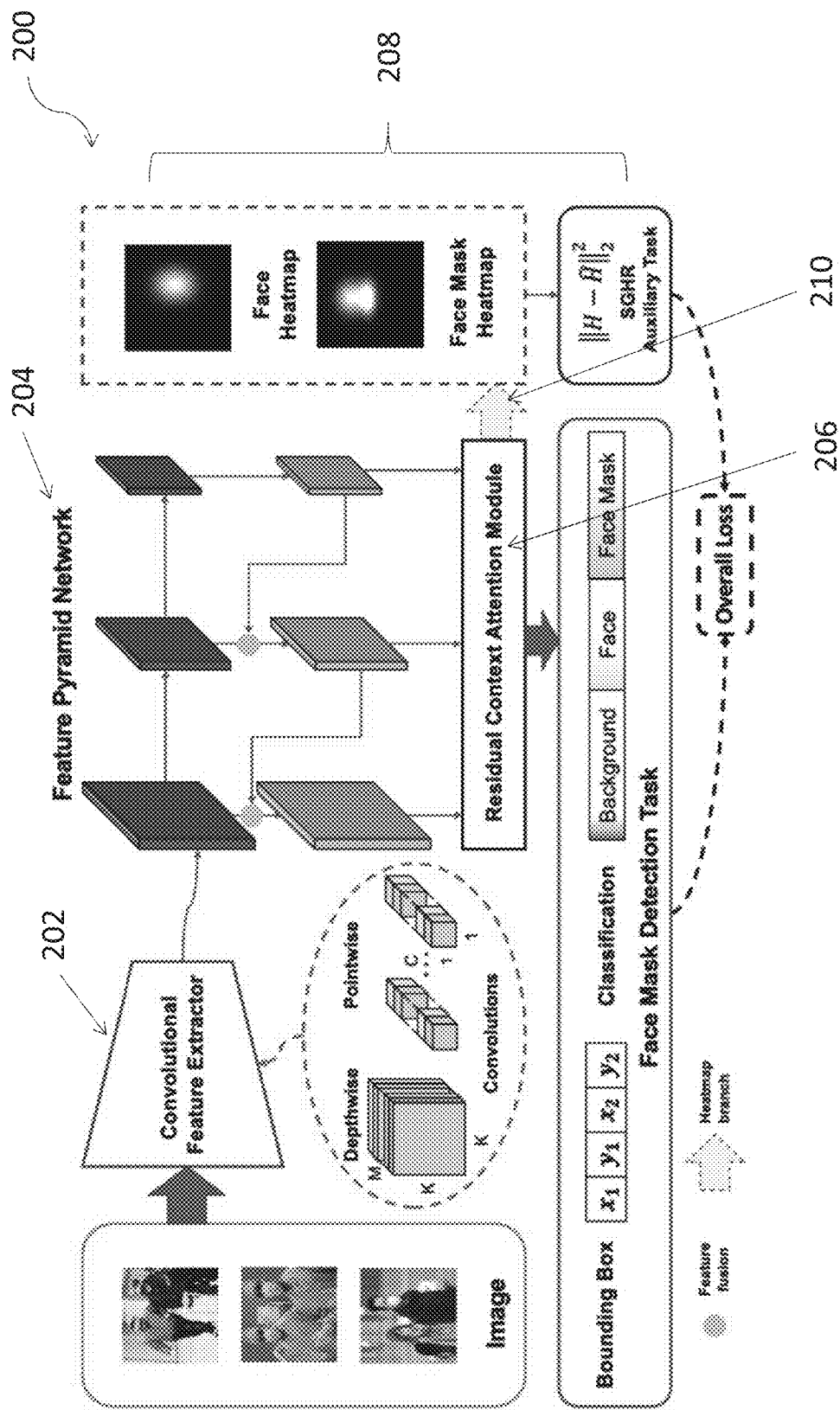
FIG. 2 is a block diagram of an embodiment of the facial image processor of FIG. 1.
Figure 3A:
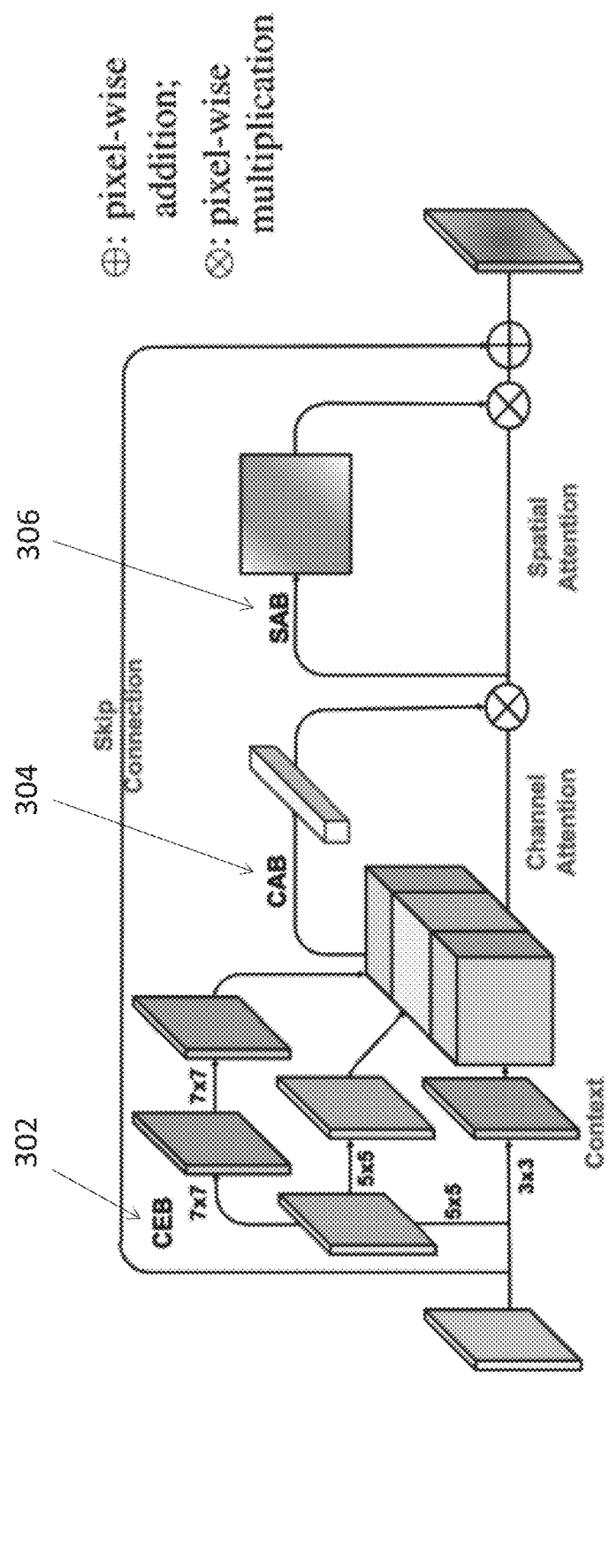
FIG. 3A is a diagram illustrated an example architecture of an embodiment of a context enhancing module of FIG. 2.

With reference to FIG. 2, there is illustrated a block diagram in a linear pipeline format, of an example facial image processor 102. As shown, the processor 102 is implemented with a learning network 200 which includes a number of components, 202, 204, 206 and 208. These components include a convolution network 202, a feature pyramid network (FPN) 204, a context enhancing module 206, which is also referred to as a residual context attention module and a heatmap regression module 208 which may also be referred to as a synthesized Gaussian heatmap regression (SGHR). Together, these components 202 to 208 of the learning network 200 operate to extract features that may be indicators of facial apparatuses being worn or covering a face when trained, with the various components of the learning network 200 operating within a pipeline to direct, focus or enhance the spatial, channel or context of each image relevant to faces or facial apparatuses so as to improve the performance of the learning network 200 in being able to extract features which are necessary to provide the facial apparatus detection function.

In this embodiment, the learning network 200 includes a depth-wise separable convolution network 202 based backbone, which in one example is implemented with "MobileNet" (as described in A. G. Howard, M, Zhu, Mobilenets: Efficient convolution neural networks for mobile vision applications, arXiv preprint arXiv:1704.04861, 2017). The uses of a depth-wise convolution 202 and a point-wise convolution in series may reduce the computational load of the learning network 200 and thereby assist in the reduction of computation resources in operating the facial image processor 102.

To illustrate this improvement, let's assume the output shape of a standard convolution is C×H×W, and there are C standard 2D convolution kernels of size K×K×M, the number of multiplications is therefore K×K×M×C×H×W. For a depth-wise separable convolution, this is (K×K×M×1+1×1× M×C)×W×H, which is $$\frac{1}{C} + \frac{1}{K^2}$$

times smaller.

During trials and experiments as performed by the inventors, it was observed that the number of channels significantly influences the speed in the processing by the learning network 200. Mobilenet 0.25, which is one of the thinnest Mobilenets available, with 0.25 times the number of channels of a regular MobileNet may render it smaller and have lower latency in operation. Then, as each feature map corresponds to different receptive fields on the input images, an application of a multi-scale strategy to perform detection on three feature maps may then be used to find faces of different sizes.

However, lower layers may not contain high-level semantic information, and thus to address this concern, a Feature Pyramid Network (FPN) 204 as described in T.-Y. Lin, P. Dollár, R. Girshick, K. He, B. Hariharan, and S. Belongie, "Feature pyramid networks for object detection," in Proceedings of the IEEE Conference on Computer Vision and Pattern Recognition, 2017, pp. 2117-2125, may be applied to fuse high-level semantic information with lower layer feature maps. In this example, the size of the three feature maps used are:

$f_1 \in \mathbb{R}^{64\times80\times80}$, $f_2 \in \mathbb{R}^{64\times40\times40}$ and $f_3 \in \mathbb{R}^{64\times20\times20}$.

Preferably, in this embodiment, two different size anchors may then be generated on each feature map. Although an FPN 204 may use high-level semantic information, it may not solve the problem caused by the separation of convolutions which reduces the capability of feature extraction. Accordingly, in order to address this concern, it is preferred that the learning network further includes two additional modules. The first of these modules is the context enhancing module 206, which may also be referred to as the Residual Context Attention Module (RCAM), whilst the second is a heatmap regression module 208 or referred to as the synthesized Gaussian heatmap regression (SGHR) module.

In this example, the context enhancing module 206 or RCAM is arranged to focus on learning important information, whilst the heatmap regression module 208 or SGHR, may be arranged to learn more discriminating features for faces with and without facial apparatuses such as masks. Preferably, the context enhancing modules or RCAMs are directly applied to the fused feature maps from FPN. Then, a heatmap branch 210 may be added by performing a 1×1 convolution kernel on the output of the context enhancing module (RCAM) 206 to generate a one-channel map for the heatmap regression module (SGHR) 208.

Preferably, the detection heads use a 1×1 convolutional kernel to form a 4×2 dimensioned bounding box of coordinates, and $n_c$×2 dimensioned classes, where the size 4 dimension is formed by the left corner $x_1,y_1$ and right corner $x_2,y_2$ coordinates, $n_c$ is the number of classes, and the size 2 dimension is formed by the two prior anchors of different sizes for each pixel.

In this example embodiment, the task of face mask detection may be more difficult than face detection. This is because the learning network 200 has to locate the face as well as distinguish faces with and without facial apparatuses (such as masks). To focus on face areas where such masks may appear, the context enhancing module 206 as shown in detailed with reference to FIGS. 3A to 3C may be used. Preferably, the context enhancing module (RCAM) 206 contains three major blocks. These include a context enhancement block (CEB) 302 as shown in detail in FIG. 3A, a channel attention block (CAB) 304 as shown in detail in FIG. 3B, and a spatial attention block (SAB) 306 as shown in detail in FIG. 3C.

For the CEB 302, three parallel branches with 3×3, 5×5 and 7×7 receptive fields are formed to enhance context information, similar to the context module in single-stage headless face detector as described in M. Najibi, P. Samangouei, R. Chellappa, and L. S. Davis, "SSH: Single stage headless face detector," in Proceedings of the IEEE International Conference on Computer Vision, 2017, pp. 4875-4884. In order to reduce the number of parameters while maintaining the same receptive field size, all branches may be implemented by 3×3 convolution kernels. The branch with a 5×5 receptive field is implemented by two consecutive 3×3 convolution kernels, and that with a 7×7 receptive field is realized by three consecutive 3×3 convolution kernels. These feature maps from the branches are concatenate to form an enhanced context feature map.

Figure 3B:
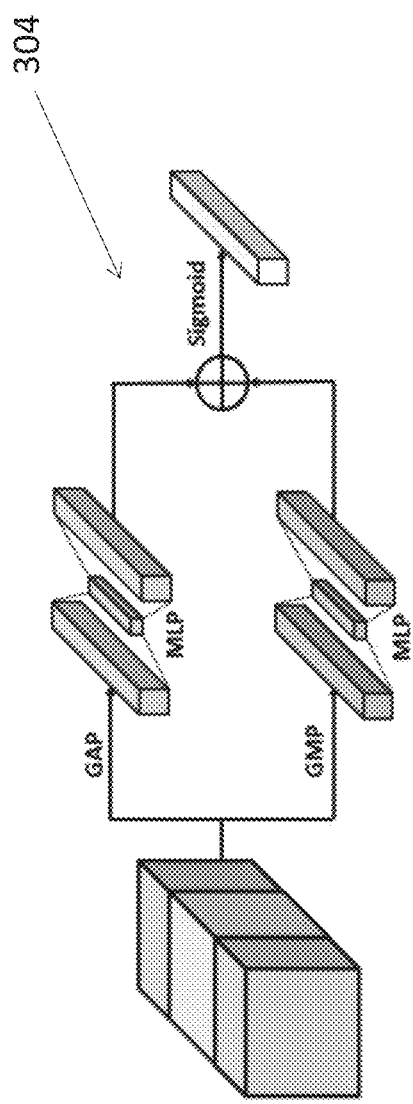
FIG. 3B is a diagram illustrated an example network architecture of an embodiment of channel attention block of FIG. 3A.
Figure 3C:
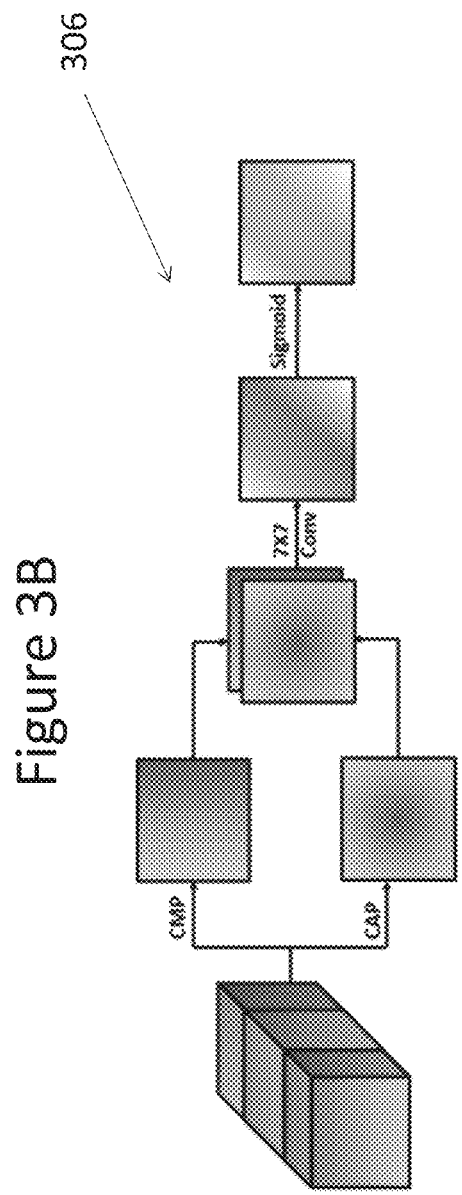
FIG. 3C is a diagram illustrated an example network architecture of an embodiment of a spatial attention block of FIG. 3A.
Figure 4:
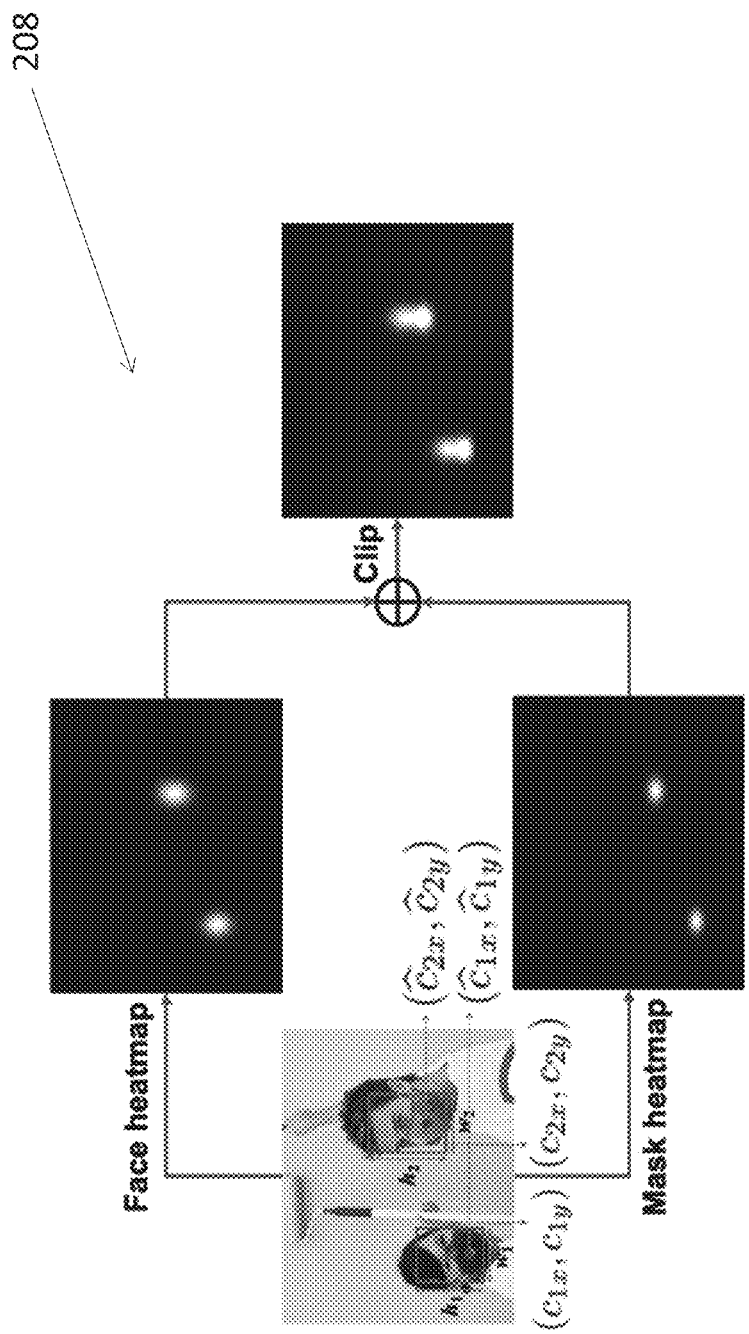
FIG. 4 is a diagram illustration an example derivation of a heatmap by an embodiment of heatmap regression module of FIG. 2; and, FIG. 5 is a set of images illustrating a subset of the different types of in the wild scenarios in the presentation of facial apparatuses that may be found in images or a stream of images.

Preferably, in order to focus on the important facial apparatus (face mask) related features, the convolutional block attention module (CBAM) may be cascaded S. Woo, J. Park, J.-Y. Lee, and I. So Kweon, "Cbam: Convolutional block attention module," in Proceedings of the European Conference on Computer Vision, 2018, pp. 3-19 after the CEB 302, and a skip connection may be added. This attention module consists of a CAB 304 as shown in FIG. 3B and a SAB 306 as shown in FIG. 3C. The CAB 304 assigns the weights on each channel of the input features, while the SAB 306 calculates a spatial attention map to focus on the specific part of the input feature. The computation of the CAB 304 with input $f_c \in \mathbb{R}^{D \times H \times W}$ is $$A_c = \sigma(\text{MLP}(\text{GAP}(f_c)) + \text{MLP}(\text{GMP}(f_c))), \quad (1)$$

and that of SAB 306 is $$A_s = \sigma(\text{Conv2D}(\text{Concat}(\text{CAP}(f_c), \text{CMP}(f_c)))), \quad (2)$$

where $A_c \in \mathbb{R}^D$ and $A_s \in \mathbb{R}^{H \times W}$ denote the channel and spatial attention; $\sigma$ is the sigmoid function to normalize the output to (0, 1); MLP refers to the multi-layer perceptron, which in this example is a 3-layer fully connected network with the number of neurons of the intermediate layer (D/8), although other structures may also be implemented as required. The terms GAP and GMP stand for global average pooling and global maximum pooling; CAP and CMP stand for channel average pooling and channel maximum pooling; Conv2D represents a 2-dimensional convolution; Concat is the channel concatenation operation. Finally, a skip connection is added to avoid information loss and gradient vanishing.

Embodiments of the learning network 200 described above may be considered to be a light-weight network which is small and fast. However, in some examples, such a light weight and small network may offer a relatively weak feature extraction ability. In order to address this concern, it is preferred that steps be taken to enhance the feature learning of discriminating features for face areas with and without masks, and thus one preferred option is to further include a heatmap regression module 208 or SGHR within the learning network to offer auxiliary learning.

In this embodiment, an image may contain $n_1$ bounding boxes of facial apparatuses (e.g. face masks) and $n_2$ bounding boxes of faces. For the $n_1$ face mask bounding boxes, it is first possible to generate the face Gaussian heatmaps $H_{j1}^m, j \in \{1, \ldots, n_1\}$ as $$H_{j1}^m(x, y) = \exp\left(-\frac{1}{2}\left(\frac{(x - c_{jx})^2}{\sigma_{jx}^2} + \frac{(y - c_{jy})^2}{\sigma_{jy}^2}\right)\right), \quad (3)$$

where $(c_{jx}, c_{jy})$ is the central position, $h_j$ and $w_j$ are the height and width of the jth face bounding box; $\sigma_{jx}$ and $\sigma_{jy}$ control the radii of the corresponding heatmaps, and $\sigma_{jx} = h_j/6$, $\sigma_{jy} = w_j/6$. Accordingly, Gaussian heatmaps for facial apparatuses may be generated as, $$H_{j2}^m(x, y) = \exp\left(-\frac{1}{2}\left(\frac{(x - \hat{c}_{jx})^2}{\hat{\sigma}_{jx}^2} + \frac{(y - \hat{c}_{jy})^2}{\hat{\sigma}_{jy}^2}\right)\right), \quad (4)$$

where $(\hat{c}_{jx}, \hat{c}_{jy})$ is the estimated central position of facial apparatus or face mask j, which is calculated by $\hat{c}_{jx} = c_{jx} + h_j/4$, $\hat{c}_{jy} = c_{jy}$. $\hat{\sigma}_{jx} = h_j/12$, $\hat{\sigma}_{jy} = w_j/6$. Summing $H_{j1}^m$ and $H_{j2}^m$ may therefore obtain the Gaussian heatmap for face masks, $$H_j^m = H_{j1}^m + H_{j2}^m. \quad (5)$$

For the $n_2$ bounding boxes for faces without masks, their heatmaps only contain single face Gaussian heatmaps $H_i^f$, $i \in \{1, \ldots, n_2\}$, which is the same as the calculation in equation (3). Finally, by summing the face mask and face heatmaps and suppressing the maximum value, it is then possible to obtain a final synthesized Gaussian heatmaps (SGHs) as $$H = \sum_{i=1}^{n_1} H_i^f + \sum_{j=1}^{n_2} H_j^m \quad (6)$$

$$H \leftarrow \text{clip}(H, 1) \quad (7)$$

where clip (H,1) is to avoid the maximum of H exceeding 1. These derivations are shown with reference to an example as presented in FIG. 4.

In this embodiment, the objective of heatmap regression module or SGHR 208, is to predict heatmaps as close as possible to ground truth SGHs. Thus, an $l_2$ loss performs regression between the predictive heatmap $\hat{H}$ and the ground truth heatmap H as $$\mathcal{L}_h(\hat{H}, H) = \|\hat{H} - H\|_2^2. \quad (8)$$

In this example, the learning network is arranged to provide three outputs for each input image. These include:
— a localization offset prediction $\hat{Y}_l \in \mathbb{R}^{p \times 4}$,
  a classification confidence prediction $\hat{Y}_c \in \mathbb{R}^{p \times n_c}$, and
  a predictive heatmap $\hat{H}$, where p and $n_c$ denote the number of generated anchors and the number of classes.

There is also presented prior anchors $P \in \mathcal{L}^{p \times 4}$, the ground truth boxes $Y_l \in \mathbb{R}^{o \times 4}$ and the classification label $Y_c \in \mathbb{R}^{o \times 1}$, where o refers to the number of objects.

Prior to calculating losses, it is preferred to match and decode anchors P with the ground truth boxes $Y_l$ and the classification label $Y_c$ to obtain $P_{ml} \in \mathbb{R}^{p \times 4}$ and $P_{mc} \in \mathbb{R}^{p \times 1}$, where each row in $P_{ml}$ or $P_{mc}$ denotes the offsets or top classification label for each anchor, respectively.

Preferably, the positive localization prediction and class are defined as $Y_l^+ \in \mathbb{R}^{p_+ \times 4}$ and $\hat{Y}_c^+ \in \mathbb{R}^{p_+ \times 1}$. The positive matched anchors' localization offsets and class may also be defined as $P_{ml}^+ \in \mathbb{R}^{p_+ \times 4}$ and $P_{mc}^+ \in \mathbb{R}^{p_+ \times 1}$, where $p_+$ denotes the number of anchors whose top classification label is not zero.

To be robust to outliers, a smooth L1 loss similar to one described in S. Ren, K. He, R. Girshick, and J. Sun, "Faster R-CNN: Towards real-time object detection with region proposal networks," in Advances in Neural Information Processing Systems, 2015, pp. 91-99, may be used to regress the localization offsets as $$\mathcal{L}_l(\hat{Y}_l^+, P_{ml}^+) = \text{Smooth}_{L1}(\hat{Y}_l^+ - P_{ml}^+). \quad (9)$$

Hard negative mining similar to one described in A. Shrivastava, A. Gupta, and R. Girshick, "Training region-based object detectors with online hard example mining," in Proceedings of the IEEE Conference on Computer Vision and Pattern Recognition, 2016, pp. 761-769, may also be performed to obtain sampled negative matched anchors and the corresponding predictions, $P_{mc}^- \in \mathbb{R}^{p_- \times 1}$ and $Y_c^- \in \mathbb{R}^{p_- \times 1}$, where $p_-$ is the number of sampled negative anchors. The classification loss is computed by positive and negative samples using cross-entropy (CE) as $$\mathcal{L}_c(\hat{Y}_c^+, \hat{Y}_c^-, P_{mc}^+, P_{mc}^-) = CE(\hat{Y}_c^+, P_{mc}^+) + CE(\hat{Y}_c^-, P_{mc}^-). \quad (10)$$

Together with the heatmap loss $\mathcal{L}_h$ in equation (8), the learning network is able to derive the total loss as $$\mathcal{L} = \frac{1}{N}(\mathcal{L}_c + \alpha \mathcal{L}_l) + \beta \mathcal{L}_h, \quad (11)$$

where N is the number of matched default anchors and a and β are hyperparameters to weight the losses.

In this embodiment, within the inference stage, the learning network produces the object localization $\mathcal{L} \in \mathbb{R}^{p \times 4}$ and object confidence $Y_c \in \mathbb{R}^{p \times 3}$. The second column of $Y_c$ is the confidence of faces, $Y_{cf} \in \mathbb{R}^{p \times 1}$, and the third column of $Y_c$ is the confidence of face masks, $\hat{Y}_{cm} \in \mathbb{R}^{p \times 1}$. Following these procedures, objects with confidence lower than $t_c$ are removed, followed by performing non maximum suppression (NMS) with a threshold $t_{nm}$ to produce the final localization and confidence of faces $L'_f \in \mathbb{R}^{n_f \times 4}$, $\hat{Y}'_{cm} \in \mathbb{R}^{n_f \times 1}$, and those of facial apparatuses (face masks) $L'_m \in \mathbb{R}^{n_m \times 4}$, $\hat{Y}'_{cm} \in \mathbb{R}^{n_m \times 1}$, where $n_f$ and $n_m$ denote the number of selected faces and masks.

In an example implementation performed during the trials and experimentations, the inventors employed an adaptive moment (Adam) optimizer with an initial learning rate of $10^{-3}$. A reducing on plateau Learning Rate scheduler was used to dynamically reduce the learning rate by a power of 10, if there was no change in the validation loss over 20 epochs, then the hyperparameters of loss were: α=2 and β=10-3.

In this example, the learning network was initialized by weights pre-trained on ImageNet. The models were trained on a GPU such as NVIDIA GeForce RTX 2080 Ti and an Intel Xeon Silver 4108. The learning network was developed with PyTorch deep learning framework. Each experiment operated for 250 epochs with batch size 32. The threshold of NMS was $t_{nms}$=0.3. Examples of the number of anchors, coordinates of the anchors' centers and anchor sizes are presented below in Table 1.

TABLE 1

| # of anchors | Coordinate of center | Anchor size |
|---|---|---|
| 80 × 80 × 2 | (4 + 8i, 4 + 8j) i,j ∈ [0,79] | 16,32 |
| 40 × 40 × 2 | (8 + 16i, 8 + 16j) i,j ∈ [0,39] | 64,128 |
| 20 × 20 × 2 | (16 + 32i, 16 + 32j) i,j ∈ [0,19] | 256,512 |

To demonstrate the effectiveness of the proposed components, the inventors performed ablation studies on RCAM, SGHR, and the position of the SGHR branch. The experiments based on the AIZOO dataset are summarized in Table 2 with details below.

TABLE 2

| | | | in (%) | | |
|---|---|---|---|---|---|
| RCAM | SGH | Position | $AP_F$ | $AP_M$ | mAP |
| x | x | N/A | 89.6 | 89.9 | 89.8 |
| ✓ | ✓ | N/A | 90.3 | 91.7 | 91.0 |
| ✓ | ✓ | 3 | 92.8 | 93.1 | 92.9 |
| ✓ | ✓ | 2 | 93.6 | 94.0 | 93.8 |
| ✓ | ✓ | 1 | 93.3 | 92.9 | 93.1 |

During this phase, the inventors were able compared the detector without and with the context enhancing module (RCAM) attached to the outputs of the FPN feature maps. By using RCAM, there was a 0.7% increase in the AP for faces, a 1.8% increase in the AP for face masks, and a 1.2% increase in mAP. This demonstrated that the proposed RCAM may be able to enlarge and focus on useful context information for face mask detection.

Following this, the inventors performed further experiments by adding the heatmap regression model (SGHR) to the learning network to show the effectiveness of the SGHR auxiliary task and proceeded to run three experiments to find the best position for the SGHR branch. An auxiliary branch was placed on the output of RCAM at input feature $f_1$ from FPN or on the output of RCAM at input feature $f_2$ or on the output of RCAM at input feature $f_3$. These positions were denoted as 1, 2 and 3 for brevity. The highest AP and mAP were achieved by placing the SGH auxiliary task branch at feature $f_2$. This may be due to the $f_2$ feature maps having appropriate anchor scales for the majority of objects. Compared with the model without the SGHR branch, a maximum increase of 2.8% in mAP was observed, and the APs for each class also have an observable improvement. Accordingly, through an example ablation experiment as described, the inventors were able to demonstrate that both the context enhancing module (RCAM) and the heatmap regression module (SGHR) may yield superior results and accuracy for the learning network.

Figure 5:
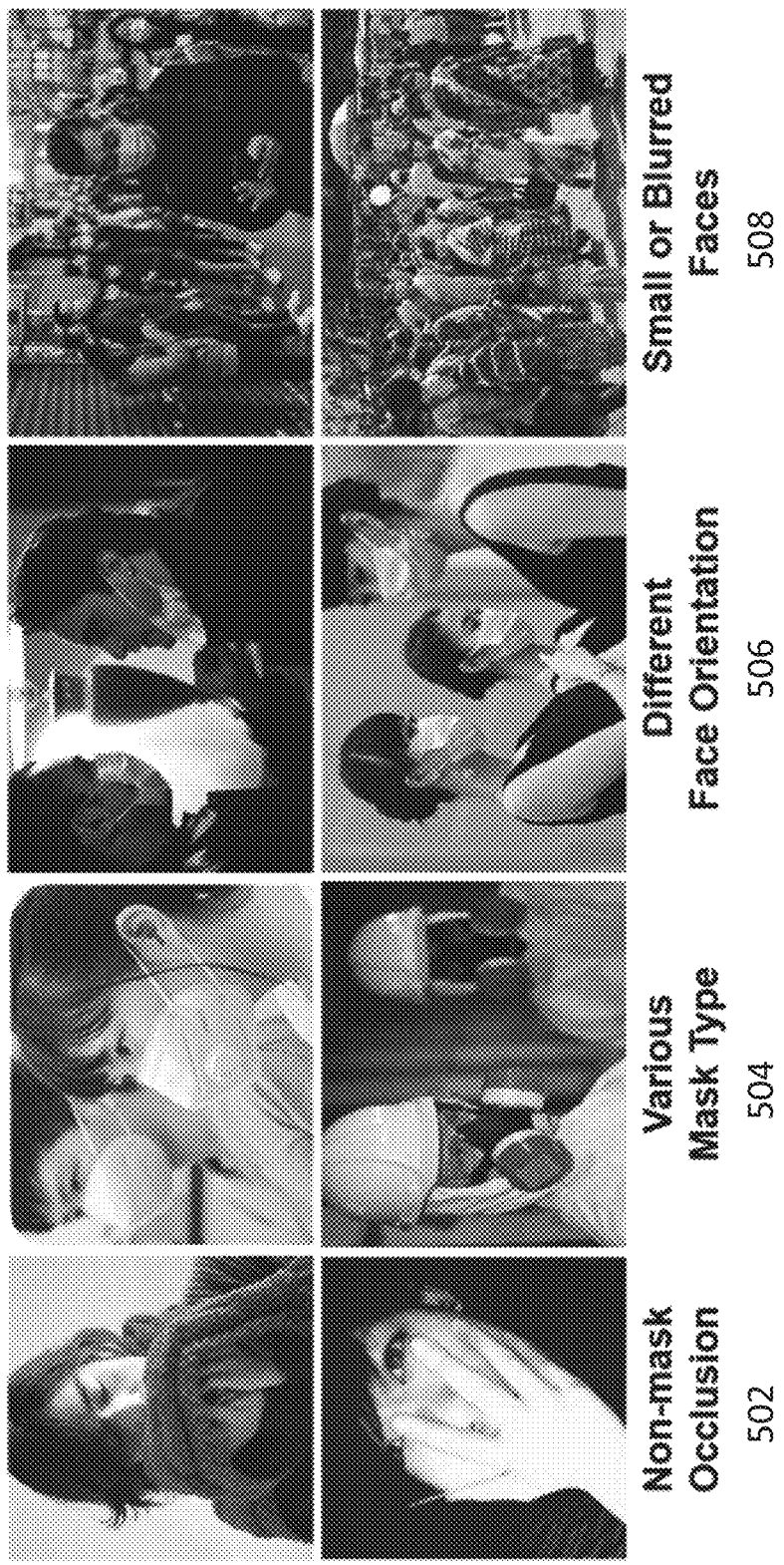

Embodiments described above of the learning network which forms part of the facial image processor are able to perform the function of analysing images, in the form of a single image or a stream of images, to determine if there is a face within the image, and if the face is currently wearing or otherwise covered with a facial apparatus such as a face mask. Moreover, example embodiments described above are also able to overcome problems with detecting face masks on faces such as non-mask occlusion 502, various types of facial apparatuses 504, different facial orientation 506 and small or blurred faces 508 as shown in FIG. 5, in turn offering accuracy in detection of facial apparatuses for the accurate generation of alerts or alarms.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for detecting a facial apparatus comprising:
a facial image processor arranged to process an image or a stream of images to detect a facial apparatus on one or more faces represented within the image or the stream of images, wherein the one or more faces is covered with a facial apparatus or is not covered with the facial apparatus,
wherein the facial image processor includes a learning network, and the learning network includes a heatmap regression module arranged to direct the learning network to discriminate features associated with one or more faces covered with the facial apparatus, and features associated with one or more faces not covered the facial apparatus represented on the image or the stream of images,
wherein, on each of the one or more faces, features of the respective face are processed within a first bounding box and features associated with the facial apparatuses are processed within a second bounding box, each of the first bounding box and the second bounding box defines a heatmap having a central position being the same to the respective bounding box, and
wherein the facial image processor is further arranged to generate a notification output based on a detection of the facial apparatus covering the one or more faces.

2. A system for detecting a facial apparatus in accordance with claim 1, wherein the facial apparatus includes a face mask.

3. A system for detecting a facial apparatus in accordance with claim 1, wherein the learning network includes a context enhancing module arranged to focus the learning network to extract features associated with facial apparatuses.

4. A system for detecting a facial apparatus in accordance with claim 3, wherein the context enhancing module focuses the learning network to extract features associated with facial apparatuses by directing the learning network to portions of the image or the stream of images where facial apparatuses may appear.

5. A system for detecting a facial apparatus in accordance with claim 4, wherein the context enhancing module includes a context enhancement block arranged to enhance context information of the image or the stream of images so as to direct the learning network to the features associated with facial apparatuses based on the context information of the image or the stream of images.

6. A system for detecting a facial apparatus in accordance with claim 5, wherein the context enhancing module further includes a channel attention block arranged to enhance channel information of the image or the stream of images so as to direct the learning network to the features associated with facial apparatuses based on the channel information of the image or the stream of images.

7. A system for detecting a facial apparatus in accordance with claim 6, wherein the context enhancing module further includes a spatial attention block arranged to enhance spatial information of the image or the stream of images so as to direct the learning network to the features associated with facial apparatuses based on the spatial information of the image or the stream of images.

8. A system for detecting a facial apparatus in accordance with claim 7, wherein the learning network includes a depth-wise convolutional network.

9. A system for detecting a facial apparatus in accordance with claim 8, wherein the depth-wise convolutional network uses a depth-wise convolution and a point-wise convolution in series.

10. A system for detecting a facial apparatus in accordance with claim 9, wherein the learning network includes a feature pyramid network.

11. A system for detecting a facial apparatus in accordance with claim 10, wherein the feature pyramid network is arranged to fuse high-level semantic information with lower layer feature maps.

12. A system for detecting facial apparatus in accordance with claim 11, wherein the images or stream of images are processed by the learning network by propagating the images or stream of images through the depth wise convolution network, the feature pyramid network, the context enhancing module and the heatmap regression module, and wherein the learning network is trained by manipulating parameters of the depth-wise convolutional network, the feature pyramid network, the context enhancing module and the heatmap regression module during training.

13. A method for detecting a facial apparatus comprising the steps of:
processing an image or a stream of images with a facial image processor, wherein the facial image processor is arranged to process the image or the stream of images to
detect a facial apparatus on one or more faces represented within the image or the stream of images, wherein the one or more faces is covered with an associated facial apparatus or is not covered with the predetermined facial apparatus;
wherein the facial image processor includes a learning network, and the learning network includes a heatmap regression module arranged to direct the learning network to discriminate features associated with one or more faces covered with the facial apparatus, and features associated with one or more faces not covered the facial apparatus represented on the image or the stream of images, and
wherein, on each of the one or more faces, features of the respective face are processed within a first bounding box and features associated with facial apparatuses are processed within a second bounding box, each of the first bounding box and the second bounding box defines a heatmap having a central position being the same to the respective bounding box; and
generating a notification output based on a detection of the facial apparatus covering the one or more faces.

14. A method for detecting a facial apparatus in accordance with claim 13, wherein facial apparatus includes a face mask.

15. A method for detecting a facial apparatus in accordance with claim 13, wherein the learning network includes a context enhancing module arranged to focus the learning network to extract features associated with facial apparatuses.

16. A method for detecting a facial apparatus in accordance with claim 15, wherein the context enhancing module focuses the learning network to extract features associated with facial apparatuses by directing the learning network to portions of the image or the stream of images where facial apparatuses may appear.

17. A method for detecting a facial apparatus in accordance with claim 16, wherein the context enhancing module includes a context enhancement block arranged to enhance context information of the image or the stream of images so as to direct the learning network to the features associated with facial apparatuses.

\* \* \* \* \*